United States Patent [19]

Smith

[11] 4,344,506
[45] Aug. 17, 1982

[54] ARRANGEMENTS FOR DRAINAGE OF LUBRICATING OIL FROM BEARING ASSEMBLIES

[75] Inventor: Stanley Smith, Bristol, England
[73] Assignee: Rolls-Royce Limited, London, England
[21] Appl. No.: 124,277
[22] Filed: Feb. 25, 1980
[30] Foreign Application Priority Data
Mar. 5, 1979 [GB] United Kingdom ............... 7907710
[51] Int. Cl.³ .............................................. F02G 7/06
[52] U.S. Cl. ................................... 184/6.11; 60/39.08
[58] Field of Search ................... 184/6.11, 6, 7 R, 12; 60/39.08; 308/187

[56] References Cited

U.S. PATENT DOCUMENTS

| | | | |
|---|---|---|---|
| 2,609,065 | 9/1952 | Douglas | 184/6.11 |
| 2,986,433 | 5/1961 | Herrmann | 60/39.08 X |
| 3,531,935 | 10/1970 | Poucher | 60/39.08 |
| 3,884,041 | 5/1975 | Zerlauth | 60/39.08 X |
| 3,890,780 | 6/1975 | Hagemeister et al. | 60/39.08 |
| 4,156,342 | 5/1979 | Korta et al. | 60/39.08 |

Primary Examiner—David H. Brown
Attorney, Agent, or Firm—Stevens, Davis, Miller & Mosher

[57] ABSTRACT

A bearing chamber is provided with drains on both sides of the bearing thus preventing oil surges spilling oil over the chamber seals. The bearing chamber has three compartments and the chamber is pressurized by air passing through the seals at its ends. A main drainage duct drains the main bearing compartment via a scavenge pump to the oil tank. Passages through the bearings under normal operation drain oil from the end compartments to the central compartment compartment A. When the main drain becomes ineffective due to sudden surges of oil to the ends of the chamber the oil passes via auxiliary drainage ducts back to the tank due to the pressure in the chamber. Baffles are provided between the bearings and the end walls of the chamber to prevent the oil sloshing over the entrances to the auxiliary drainage ducts at excessive speed thereby providing tranquil zones from which the oil passes into the drainage ducts.

9 Claims, 3 Drawing Figures

ARRANGEMENTS FOR DRAINAGE OF LUBRICATING OIL FROM BEARING ASSEMBLIES

DESCRIPTION

This invention relates to improvements in arrangements for drainage of lubricating oil from rolling element bearing assemblies. It has particular relevance to high speed bearings of the type used to support the mainshafts of gas turbine aero-engines, especially where the aircraft is likely to perform "aerobatic" maneuvres.

In gas turbine aero-engine design, it is normal practice to provide mainshaft bearings with a constant supply of lubricating oil. Most such engines use a selfcontained recirculatory oil system, in which the oil is distributed from and returned to an oil tank by means of pumps. Oil is directed onto the rolling elements by means such as an oil spray which irrigates the rolling elements from the side, or drillings in the bearing outer and/or inner races. A general description of the various types of lubricating oil systems in common use can be found in our publication "The Jet Engine" (e.g. 3rd Edition, Part 12).

One particular type of twin bearing assembly currently used to support a main shaft of a gas turbine aero-engine has a bearing housing which is sealed against the shaft and is connected to stationary (non-rotating) engine structure, the bearing housing defining a bearing chamber within which the bearings are contained. Lubricating oil is supplied to the rolling elements of the bearings and is drained from the central part of the chamber via a drainage duct connected to a scavenge pump. Oil which has passed from the central part of the chamber through the bearings drains back to the central part of the chamber through drainage passages in the bearing.

Lubricating oil in contact with the rotating parts of the bearing tends to be flung tangentially off them towards the radially outer parts of the bearing chamber, where it runs down the wall of the bearing housing towards the lowest point of the housing under the influence of gravity. The drainage duct and passages are provided at that part of the housing which is lowest when the aircraft is in its normal horizontal flight attitude.

A problem arises in that because the mainshaft bearings in gas turbine aero-engines rotate at high speeds, the oil droplets which are flung off the rotating parts have high velocities. When they collide with the oil already flowing down the walls of the bearing chamber a standing wave is formed in the oil which causes oil to flow along the wall of the housing and out of the bearing chamber through the seals between the end walls of the housing and the shaft. One way of preventing this leakage is to provide large sealing airflows into the bearing chamber through the seals between the housing and the shaft, but this is undesirable because, if the compressed air for the sealing flow is hot there is a risk of oil degradation and fire.

Further, it is clear that oil drainage problems can be aggravated when the aircraft climbs, dives or performs other aerobatic, maneuvres, in that the attitude of the aircraft may be detrimental to obtaining proper drainage of the oil through the drainage duct and passages, and also in that 'g'-forces acting on the oil may keep it away from the drainage duct and the passages. For example, changes in attitude or speed of the aircraft can cause surges of oil which can swamp the seals.

The present invention contributes to the solution of the above problems by providing more efficient drainage of lubricating oil from the bearing chamber.

According to the present invention a lubrication system for a bearing within a chamber comprises a supply system for supplying lubricant to the bearing and a drainage system for collecting lubricant which has passed through the chamber, a main drainage duct in the chamber disposed on one side of the bearing, a main scavenge pump communicating between the main drainage duct and the drainage system for pumping lubricant collecting in the main drainage duct back to the drainage system, auxiliary drainage ducting in the chamber disposed on the opposite side of the bearing to the main drainage duct, and means communicating between the auxiliary drainage ducting and the drainage system, said means bypassing the main scavenge pump.

By this means, when the bearing chamber adopts an attitude other than horizontal such that lubricant is trapped on the opposite side of the bearing to the main drainage duct, the auxiliary drainage ducting comes into operation and prevents any detrimental build up of lubricant within the chamber.

The invention is particularly applicable to bearing assemblies for aircraft gas turbine engines in which the walls of the bearing chamber extend to within a sealing clearance of a shaft which the bearing supports, and in which pressurised air is supplied to the outside of the chamber at a pressure such as to pressurise the chamber by leakage of the pressurised air into the chamber through the seal.

The auxiliary drainage ducting is preferably then of relatively small bore, or contains a flow restrictor, to minimise the flow of air into the drains system when the auxiliary drainage ducting carries no oil flow.

Preferably in a pressurised bearing as described above a baffle is provided between the bearing and the auxiliary drainage ducting, and the auxiliary drainage ducting is disposed in the space defined between the baffle and the wall of the chamber which forms a tranquil zone from which lubricant can more easily enter the auxiliary ducting.

In one particular embodiment of the invention the lubrication system is adapted to lubricate a pair of bearings supporting a shaft and disposed in a pressurised chamber, the chamber defining with the bearings and the shaft three annular compartments spaced axially along and surrounding the shaft, the first compartment extending between the bearings, and the second and third compartments extending between the bearings and the respective end walls of the chamber, the main drainage duct being situated in the first compartment and the auxiliary drainage ducting comprising at least one auxiliary drainage duct in each of the second and third compartments.

In a modification of the invention which is particularly advantageous for use in gas turbine aero-engines liable to be subject to aerobatic maneuvres, the second and third compartments are provided with a baffle which is positioned between the bearing and the outer wall of the chamber to reduce the dynamic head of oil flung from the bearing and to produce a tranquil zone with which one or more auxiliary drainage ducts communicates. Preferably, each baffle comprises an annular diaphragm projecting from the radially outer wall of the bearing chamber and extending inwards towards the shaft over part of the radial extent of the chamber. Preferably the baffle extends to within close proximity of the shaft.

Specific embodiments of the invention will now be described by way of example only, with reference to the accompanying drawings, in which.

The drawings are not to scale.

Figure 1:
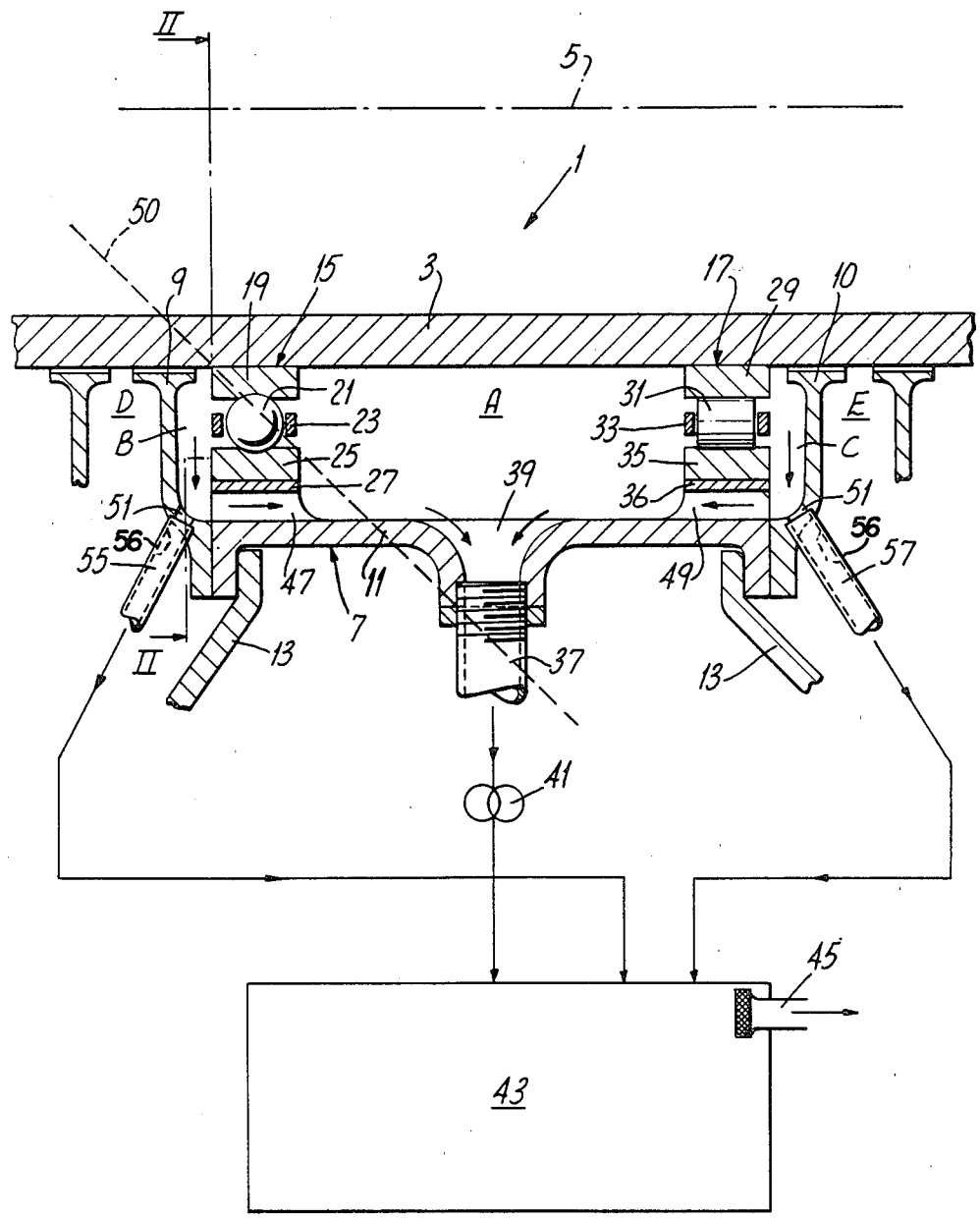
FIG. 1 is a schematic representation of part of a cross-sectional side elevation of a bearing assembly according to the invention.
Figure 2:
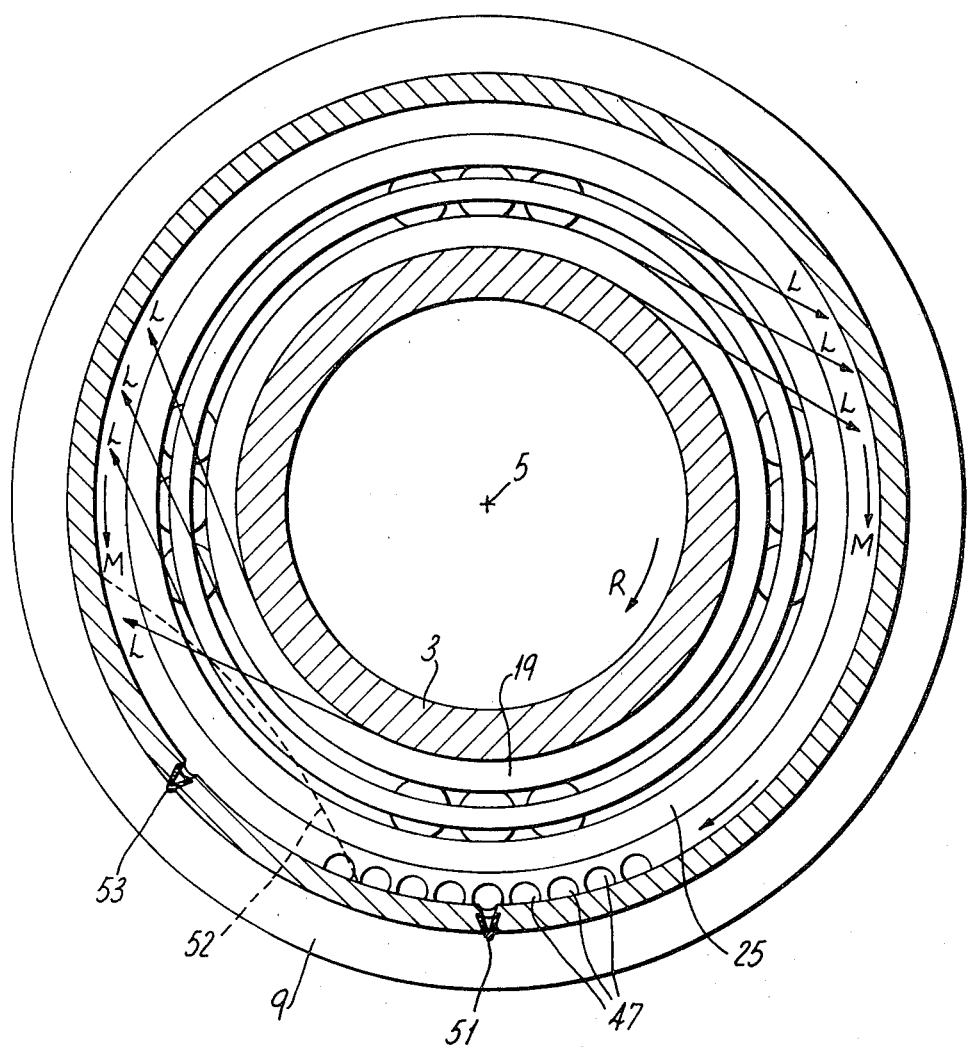
FIG. 2 is a sectional view on line II—II in FIG. 1.

In FIGS. 1 and 2, the lower half of a twin bearing assembly 1 is shown, together with a diagramatic representation of its associated oil drainage system. The bearing assembly helps to support a main shaft 3 of a gas turbine aero-engine. The shaft 3 has an axis of rotation 5. The direction of rotation is indicated in FIG. 2 by arrow R.

Bearing assembly 1 has a multi-piece bearing housing 7 provided with radially inner (inboard) sealing portions 9 and 10 which seal against the shaft 3. The seals between shaft 3 and portions 9, 10 may for example, be of the well-known labyrinth type. A radially outer (outboard) portion 11 of bearing housing 7 is fixedly connected (e.g. by bolts, not shown) to non-rotating structure 13 of the engine. Bearing housing 7, in conjunction with bearings 15,17 and shaft 3, defines a bearing chamber having three annular compartments, A, B and C, which respectively surround shaft 3 at three axially spaced locations along it. Compartment A extends between the bearings 15,17 and compartments B and C extend between the bearings 15,17 respectively and the end walls of the bearing housing 7.

Bearing 15 comprises a radially inner (rotating) race 19, which is fixed to the shaft 3, ball bearings 21 in cage 23, and a radially outer (non-rotating) race 25 which is fixed to the radially outer portion 11 of the bearing housing via ring 27. Bearing 17 similarly comprises a radially inner race 29, roller bearings 31 in cage 33, and a radially outer race 35 fixed to portion 11 via ring 36.

Lubricating oil is supplied to the rolling elements 21 21,31 by means not shown, but well known in the art, and its subsequent progress is indicated by flow arrows. Oil is drained from compartment A through a main drainage duct 39 which is connected by a pipe 37 to a scavenge pump 41 which transfers the oil to an oil tank 43. An air vent 45 is provided in tank 43.

For the purposes of this specification the oil tank and any pipe-work between the scavenge pump 41 and the oil tank constitute the drainage system.

In order to allow oil to drain into compartment A from compartments B and C, drainage passages 47,49 are provided in rings 27,36 (i.e. in bearings 15 and 17 respectively).

The seals at 9 and 10 are rendered effective to prevent leakage of oil along the shaft out of the bearing chamber by ensuring that the air pressure outside the bearing at locations D and E is greater than that inside the bearing chamber. There is thus a flow of air through the seals into the bearing chamber, causing the chamber to be pressurised to a value above the pressure at the air vent 45 in oil tank 43.

As shown in FIG. 2 by arrows L, lubricating oil in contact with the rotating parts of the bearing assembly tends to be flung tangentially off towards the radially outer parts of the bearing chamber, where, as shown by arrows M, it runs down the circumferential wall of the bearing housing 7 under the influence of gravity towards drainage hole 39 (FIG. 1) and drainage passages 47,49, these being provided at that part of the housing which is lowest when the aircraft is in its normal horizontal flight attitude.

Because of the high rotational speed of shaft 3, the oil droplets which are flung off the rotating parts of the bearing assembly have high velocities, and as explained previously, a standing wave is formed which prevents some of the oil getting to the drain 39. Also, when the aircraft is performing aerobatic, maneuvres, or is in a long climb or dive, the oil can be displaced to one end of the chamber. In FIG. 1, the dashed line 50 in the bearing chamber indicates a possible oil level when the aircraft is in a long dive, assuming a flight direction towards the left of the drawing. It will be seen that drainage of oil into drainage hole 39 is impeded and, if the dive is steep the excess oil can spill over the seal 9. In FIG. 2, the dashed line 52 indicates a standing wave formed due to momentum interchange between oil spray L and the oil flow M down the walls of the bearing chamber.

In order to considerably lessen the possibility that oil can build up sufficiently to overcome the sealing air flow into the bearing chamber and leak past the seal portions 9 and 10, the invention provides auxiliary drainage ducts 51, and 53 (FIG. 2) in each of the compartments B and C.

The drainage ducts 51,53 are provided at those angular positions within the compartments B and C which are most likely to experience an excessive build-up of drainage oil. Drainage ducts 51, from the two compartments B and C are connected into the oil drainage system by means of pipes 55,57 respectively at a convenient location downstream of the scavenge pump 41, and in the present example this location is in the oil tank 43, adjacent the air vent 45. Similarly, drainage ducts 53 are connected directly back to the drains downstream of the scavenge pump 41 by further pipes (not shown). The drainage ducts 51,53 are arranged to communicate with the drains system downstream of the scavenge pump 41 to avoid the detrimental effect on the operation of the pump which would be the case if it were supplied from more than one source.

Because the bearing chamber is pressurised any oil in the auxiliary drainage ducts and pipes will be forced into the drainage system by the air pressure and additional scavenge pumps should not be necessary. To avoid excessive air loss, the auxiliary drainage ducts and pipes are preferably of small bore. If, however, to aid oil collection, it is found necessary to use auxiliary drainage ducts and pipes of a bore which would otherwise cause too large an air flow through the vent 45, flow restrictions 56 can be used in the pipes. The scavenge pump 41 acts as a restrictor in the pipe 37 leading from the main drainage duct 39.

Although two auxiliary drainage ducts are here provided for each of compartments B and C, it may be advantageous to provide more than two at various angular locations around the compartments with suitable flow restrictors to avoid swamping the vent 45 with air, or it may be justifiable to provide only one such drainage duct for each compartment in some circumstances.

Figure 3:
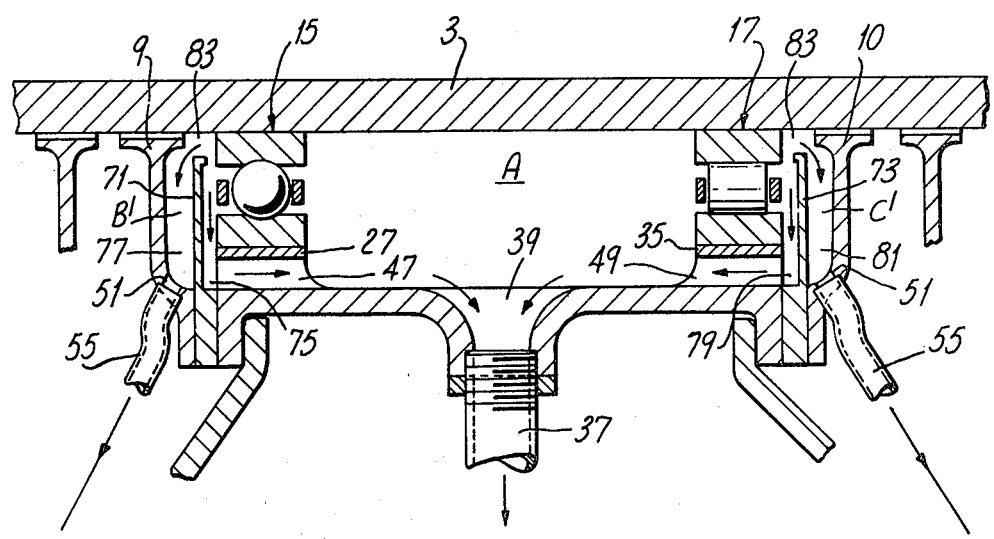
FIG. 3 is a schematic representation of a modification of the embodiment of FIG. 1.

Under some circumstances, for example, during sudden aerobatic, maneuvres, a surge of oil may flow over the holes at a sufficiently high velocity to make it impossible for the oil to enter the holes in quantities sufficient to avoid an excessive build-up of oil against the seals 9 and 10. FIG. 3 shows a modification which alleviates this situation.

In FIG. 3, the bearing assembly is of identical construction to that shown in FIGS. 1 and 2 except that compartments B' and C' in FIG. 3 are provided with baffles 71 and 73, these baffles being positioned to produce a barrier to flow of oil directly onto the seal.

Baffles 71 and 73 each take the form of an annular diaphragm which projects from the radially outer wall of the bearing chamber and extends inwards towards shaft 3 over part of the radial extent of the chamber, thus dividing each of compartments B' and C' into a pair of channels 75,77 and 79,81 respectively. Each pair of channels is interconnected via space 83 between the edges of the baffles 71,73 and shaft 3 and the auxiliary drainage ducts 51,53, are positioned between the baffles and the seals.

Under normal conditions of operation, most of the oil spray thrown off bearings 15,17 is intercepted by baffles 71,73 and flows along them towards drain passages 47,49 in rings 27,35. Consequently, under normal conditions, most drainage oil is pumped out of the bearing chamber via main drainage duct 37.

Under abnormal conditions, such as an aerobatic maneuvres or a long climb or dive by the aircraft, when a large excess of oil builds up in the compartments B' or C', oil can flow through the spaces 83 from the channels 75,79 into the channels 77,81 respectively and instead of lying against the seals 9 or 10, is evacuated from the bearing chamber through auxiliary drainage ducts 51 etc. in channels 77 and 81.

I claim:

1. A lubrication drainage system for draining lubricant which has collected in a chamber, said chamber encircling a shaft and enclosing a bearing on said shaft, said drainage system comprising:
a main drainage duct in said chamber disposed on one side of the bearing, a main scavenge pump pumping lubricant from said main drainage duct, auxiliary drainage ducting in the chamber disposed on the opposite side of the bearing to the main drainage duct, and means for the lubricant flowing through said auxiliary drainage ducting to bypass said scavenge pump.

2. A lubrication drainage system as claimed in claim 1 wherein the end walls of the bearing chamber extend to within a sealing clearance of the shaft which, in operation, the bearing supports, and in which pressurized air is supplied to the outside of the chamber at a pressure such as to pressurize the chamber by leakage of the pressurized air into the chamber through the seal.

3. A lubrication drainage system as claimed in claim 2 wherein the auxiliary drainage ducting is of smaller bore than the main drainage ducting.

4. A lubrication drainage system as claimed in claim 2 wherein the auxiliary drainage ducting includes a flow restrictor between the bearing chamber and the drainage system.

5. A lubrication drainage system as claimed in claim 2 wherein a baffle is provided between the bearing and the seal, and the auxiliary drainage ducting communicates with the bearing chamber between the baffle and the seal.

6. A lubrication drainage system as claimed in claim 2 having a pair of bearings in the chamber for supporting the shaft, the chamber defining with the bearings and the shaft three annular compartments spaced axially along and surrounding the shaft the first compartment extending between the bearings, and the second and third compartments extending between the bearings and the respective end walls of the chamber, the main drainage duct being situated in the first compartment and the auxiliary drainage ducting comprising at least one auxiliary drainage duct in each of the second and third compartments.

7. A lubrication drainage system as claimed in claim 6 wherein each of the second and third compartments is provided with a baffle which is positioned between a bearing and the respective end wall of the chamber, and the auxiliary drainage ducts communicate with the compartments between the baffles and the end walls.

8. A lubrication drainage system as claimed in claim 5 or claim 7 wherein each baffle comprises an annular diaphragm projecting from the radially outer wall of the bearing chamber and extending inwards towards the shaft over part of the radial extent of the chamber.

9. A lubrication drainage system as claimed in claim 8 wherein each baffle extends to within close proximity of the shaft.

* * * * *